(12) United States Patent
Srinivasan

(10) Patent No.: US 10,387,850 B1
(45) Date of Patent: Aug. 20, 2019

(54) SYSTEMS AND METHODS FOR LEAST COST ACQUIRER ROUTING FOR PRICING MODELS

(71) Applicant: Vantiv, LLC, Symmes Township, OH (US)

(72) Inventor: Thiru Srinivasan, Highlands Ranch, CO (US)

(73) Assignee: Worldpay, LLC, Symmes Township, OH (US)

( * ) Notice: Subject to any disclaimer, the term of this patent is extended or adjusted under 35 U.S.C. 154(b) by 190 days.

(21) Appl. No.: 15/274,095

(22) Filed: Sep. 23, 2016

(51) Int. Cl.
*G06Q 40/00* (2012.01)
*G06Q 20/02* (2012.01)
*G06Q 20/24* (2012.01)
*G06Q 20/34* (2012.01)

(52) U.S. Cl.
CPC .......... *G06Q 20/027* (2013.01); *G06Q 20/24* (2013.01); *G06Q 20/356* (2013.01)

(58) Field of Classification Search
CPC ... G06Q 20/405; G06Q 20/356; G06Q 20/027
See application file for complete search history.

(56) References Cited

U.S. PATENT DOCUMENTS

| 7,167,924 B1 * | 1/2007 | Symonds | G06Q 20/10 705/43 |
|---|---|---|---|
| 2003/0055783 A1 * | 3/2003 | Cataline | G06Q 20/00 705/40 |

(Continued)

FOREIGN PATENT DOCUMENTS

| WO | WO-0154026 A1 * | 7/2001 | ............ G06Q 20/04 |
|---|---|---|---|
| WO | WO-2010106395 A1 * | 9/2010 | ............ G06Q 20/04 |
| WO | WO-2011119540 A1 * | 9/2011 | ............ G06Q 20/02 |

OTHER PUBLICATIONS

Tom DeSimone, "Trading Ease for Transparency With Interchange-Plus," posted on the internet at www.merchantmaverick.com on Nov. 10, 2009 and captured at https://archive.org on Oct. 29, 2015 (Year: 2009).*

(Continued)

*Primary Examiner* — Abhishek Vyas
*Assistant Examiner* — William B. Bunker
(74) *Attorney, Agent, or Firm* — Bookoff McAndrews, PLLC

(57) ABSTRACT

Systems and methods are disclosed for least cost acquirer routing based on pricing models. One method comprises: receiving transaction-related information from a merchant, the transaction-related information including a payment network identifier of the payment network used in the initiated payment transaction; identifying the payment network used based on the payment network identifier determining the primary qualification criteria pertaining to the payment network used; determining an interchange rate and an interchange category based on the primary qualification criteria and the received transaction related information; determining a pricing model of an acquirer that yields the lowest fees applicable to the merchant based on one or more of, the transaction related information, the primary qualification criteria, and the interchange category; and transmitting the transaction-related information to the acquirer.

16 Claims, 3 Drawing Sheets

(56) References Cited

U.S. PATENT DOCUMENTS

| | | | | |
|---|---|---|---|---|
| 2004/0088238 A1* | 5/2004 | Gilson | G06Q 30/04 | 705/35 |
| 2007/0233597 A1* | 10/2007 | Petersen | G06Q 20/04 | 705/39 |
| 2009/0063291 A1* | 3/2009 | Robbins | G06Q 20/10 | 705/26.1 |
| 2011/0313869 A1* | 12/2011 | McAlhaney | G06Q 20/20 | 705/16 |
| 2012/0221468 A1* | 8/2012 | Kunnnick | G06Q 20/20 | 705/44 |
| 2012/0271765 A1* | 10/2012 | Cervenka | G06Q 20/12 | 705/44 |
| 2013/0054465 A1* | 2/2013 | Sakata | G06Q 30/04 | 705/44 |
| 2013/0254110 A1* | 9/2013 | Royyuru | G06Q 20/38 | 705/44 |
| 2013/0311375 A1* | 11/2013 | Priebatsch | G06Q 30/06 | 705/44 |
| 2014/0025762 A1* | 1/2014 | Singh | G06Q 20/40 | 709/206 |
| 2014/0129358 A1* | 5/2014 | Mathison | G06Q 20/027 | 705/17 |
| 2014/0214651 A1* | 7/2014 | Prasadh | G06Q 20/12 | 705/39 |
| 2014/0257977 A1* | 9/2014 | Mohsenzadeh | G06Q 20/34 | 705/14.51 |

OTHER PUBLICATIONS

First Data White Paper, "Merchant Options for Lowering Payment Costs," published by First Data Corporation in 2012 (Year: 2012).*

Jim Daly, "Rewriting the Transaction Routing Rules," Digital Transaction News, Jan. 1, 2011 (Year: 2011).*

* cited by examiner

FIG. 3A

| PAYMENT NETWORK 1 | PAYMENT NETWORK 2 | PAYMENT NETWORK 3 |
|---|---|---|
| PRIMARY QUALIFICATION CRITERIA | PRIMARY QUALIFICATION CRITERIA | PRIMARY QUALIFICATION CRITERIA |
| INTERCHANGE RATE | INTERCHANGE RATE | INTERCHANGE RATE |
| 1.6% | 1.05% | 1.65% |

| | ACQUIRER 1 | | | | ACQUIRER 2 | | | | ACQUIRER N | | |
|---|---|---|---|---|---|---|---|---|---|---|---|
| INTERCHANGE PLUS | QUALIFIED | MID-QUALIFIED | NON-QUALIFIED | INTERCHANGE PLUS | QUALIFIED | MID-QUALIFIED | NON-QUALIFIED | INTERCHANGE PLUS | QUALIFIED | MID-QUALIFIED | NON-QUALIFIED |
| .12% | 0.05% | 0.07% | 0.08% | 0.09% | 0.09% | 0.08% | 0.09% | 0.06% | 0.07% | 0.08% | 0.09% |

| COMPARISON TABLE | PRICE |
|---|---|
| ACQUIRER 1 QUALIFIED | 0.05% |
| ACQUIRER 2 MID-QUALIFIED | 0.08% |
| ACQUIRER N INTERCHANGE PLUS | 0.07% |

| | MARKETPLACE | | | ACQUIRER 1 | | | ACQUIRER 2 | | |
|---|---|---|---|---|---|---|---|---|---|
| MERCHANT ID | TERMINAL ID | MESSAGE FORMAT | MERCHANT ID | TERMINAL ID | MESSAGE FORMAT | MERCHANT ID | TERMINAL ID | MESSAGE FORMAT |
| XYZ | 543546 | JSON | ABC | 283755969 | 8583 | BKLW | 3F55632 | XML |

324 326 328 330 332 334

SYSTEMS AND METHODS FOR LEAST COST ACQUIRER ROUTING FOR PRICING MODELS

FIELD OF DISCLOSURE

The present disclosure relates generally to the field of payment transactions and, more particularly, to payment transactions that include acquirer routings.

BACKGROUND

Merchants may choose various acquiring institutions or banks ("acquirers") to process payment transactions through the various payment networks used by consumers. The payment networks may include credit networks (e.g., Visa, Master Card, Discover, American Express, etc.) and/or debit networks (e.g., Star, Plus, Genie, Cirrus, etc.). The acquirers may use a number of pricing models to process a payment transaction. Typically, the pricing models may include one or more of a "tiered" pricing model and an "interchange plus" pricing model. The tiered pricing model may comprise qualified, mid-qualified, and non-qualified rates.

However, the various pricing models (e.g., tiered pricing and the interchange plus pricing models) may have interchange categories and/or interchange rates that may be predetermined by the payment network being used.

Payment networks may use a number of factors to determine the interchange category and/or interchange rate for a given transaction. Some of these factors may be controlled or influenced by the merchant, the factors including but not limited to, the processing method (e.g.: card present and card-not-present), the Merchant Category Code (MCC), and transaction data. However, payment networks may also use factors that may be outside of the control of a merchant to determine the interchange category and/or interchange rate for a given transaction. These factors, which a merchant may not be able to control or influence include, but are not limited to, the card type (separate interchange categories exist for credit and debit card charges), the card brand, and/or the card owner (whether a credit or debit card is issued to an individual, business, corporation, or municipal agency impacts interchange qualification).

The interchange rates may be coupled with a markup rate, typically decided by an acquirer. Thus, while the interchange categories and/or interchange rates may be controlled by the payment networks, the markup rate may be added by the acquirer. The combination of the interchange rate and the markup rate may form the discount rate that an acquirer charges a merchant.

The markup rates may vary widely between acquirers. The variation may exist even for the same interchange categories and/or interchange rates, payment networks and/ or card types, or Merchant Category Code (MCC) assigned to the merchant by the payment network. As such, there may not be any set standards and/or established algorithms by which acquirers come up with a markup rate to be added to the interchange rate. Often, acquirers may base the markup rate on a certain interchange category (not to be confused with interchange rate). The interchange category may be determined based on the payment network (e.g., Visa, MasterCard, Discover, American Express, JCB, etc., for credit networks, and/or Star, Plus, Genie, Cirrus, etc., for debit networks) of the cardholder used in the purchase transaction.

Thus, the determination of a markup rate may be arbitrary and/or the determination may be entirely up to an individual acquirer to price their markup rates, regardless of the pricing model selected.

Furthermore, in the case of tiered pricing models, for a given transaction having an interchange category and/or interchange rate based on a payment network being used, one acquirer may designate a markup rate as a qualified rate, whereas another acquirer may designate a markup rate as a mid-qualified rate, non qualified rate, etc. In other words, two acquirers may classify the same interchange category for a particular purchase transaction as falling into different tiers in the tiered pricing model, and may therefore have different markup rates, leading to different discount fees being paid by the merchant. Thus, a merchant may pay different discount rates depending on which acquirer a merchant has signed up with.

Likewise, in the case of the interchange plus pricing model, the markup rate added to an interchange rate for the interchange plus pricing model may also vary widely among acquirers. This variance in the markup rate among acquirers may occur even for the same interchange category, payment network, card type, card owner, and MCC of the merchant.

The variance in markup rates among acquirers, for tiered pricing models and interchange plus pricing models, may create an environment in which a merchant may desire to shop around for the lowest discount rate payable for a given purchase transaction, the discount rate being a combination of the markup rate decided by the acquirer and the interchange rate.

If a merchant has a large volume of transactions, then the savings from paying the lowest transaction fees could easily add up to hundreds and thousands of dollars per month. This problem may especially be problematic in cases where a merchant has multiple locations and/or multiple business lines per location in the case of multi-format retailer, such as a "big box store" (ex: photography section, salon section, vision section, electronics section, apparel section, etc., wherein each section may have its own MCC).

Furthermore, it may be burdensome for a merchant, at every payment transaction, to search for and sign up for the least cost acquirer, or be able to manage the communication of transaction information between payment terminals and acquirer processors, especially when there are different messaging formats used in the communication.

Thus, there is a desire for a system and method for allowing a merchant to automatically find the least cost discount rate for a given purchase transaction. Furthermore, there is a desire for such a system and method to be able to communicate and network efficiently between various payment terminals, and a plurality of acquirers.

SUMMARY

According to certain aspects of the present disclosure, systems and methods are disclosed for least cost acquirer routing for tiered and interchange plus pricing models.

In one embodiment, a computer-implemented method is disclosed for least cost acquirer routing for various pricing models, e.g., tiered and interchange plus pricing models. The method comprises: receiving transaction-related information from a terminal of a merchant, the transaction-related information including a merchant identifier of the merchant with whom a payment transaction is initiated, a terminal identifier of the terminal where a payment transaction is initiated, and a payment network identifier of the payment network used in the initiated payment transaction, wherein the terminal identifier is mapped to the merchant identifier; identifying the payment network used based on the payment network identifier determining, from a plurality of payments networks and primary qualification criteria for each payment network stored in an electronic storage medium, the primary qualification criteria pertaining to the payment network used; determining an interchange rate and an interchange category based on the primary qualification criteria and the received transaction related information; determining, from a plurality of acquirers and pricing models associated with each acquirer in an electronic storage medium, a pricing model of an acquirer that yields the lowest fees applicable to the merchant based on one or more of, the transaction related information, the primary qualification criteria, and the interchange category; and transmitting the transaction-related information to the acquirer.

In accordance with another embodiment, a system is disclosed for least cost acquirer routing for various pricing models, e.g., tiered and interchange plus pricing models. The system comprises: a data storage device storing instructions a least cost acquirer routing for tiered and interchange plus pricing models; and a processor configured for: a data storage device storing instructions for a least cost acquirer routing based on pricing models, a plurality of payments networks and primary qualification criteria for each payment network, and a plurality of acquirers and pricing models associated with each acquirer in an electronic storage medium; and a processor configured to execute the instructions to perform a method including: receiving transaction-related information from a terminal of a merchant, the transaction-related information including a merchant identifier of the merchant with whom a payment transaction is initiated, a terminal identifier of the terminal where a payment transaction is initiated, and a payment network identifier of the payment network used in the initiated payment transaction, wherein the terminal identifier is mapped to the merchant identifier; identifying the payment network used based on the payment network identifier determining the primary qualification criteria pertaining to the payment network used; determining an interchange rate and an interchange category based on the primary qualification criteria and the received transaction related information; determining a pricing model of an acquirer that yields the lowest fees applicable to the merchant based on one or more of, the transaction related information, the primary qualification criteria, and the interchange category; and transmitting the transaction-related information to the acquirer.

In accordance with another embodiment, a non-transitory machine-readable medium is disclosed that stores instructions that, when executed by a marketplace computing system, causes the marketplace computing system to perform a method for least cost acquirer routing for various pricing models, e.g., tiered and interchange plus pricing models. The method includes: receiving transaction-related information from a terminal of a merchant, the transaction-related information including a merchant identifier of the merchant with whom a payment transaction is initiated, a terminal identifier of the terminal where a payment transaction is initiated, and a payment network identifier of the payment network used in the initiated payment transaction, wherein the terminal identifier is mapped to the merchant identifier; identifying the payment network used based on the payment network identifier determining, from a plurality of payments networks and primary qualification criteria for each payment network stored in an electronic storage medium, the primary qualification criteria pertaining to the payment network used; determining an interchange rate and an interchange category based on the primary qualification criteria and the received transaction related information; determining, from a plurality of acquirers and pricing models associated with each acquirer in an electronic storage medium, a pricing model of an acquirer that yields the lowest fees applicable to the merchant based on one or more of, the transaction related information, the primary qualification criteria, and the interchange category; and transmitting the transaction-related information to the acquirer.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

FIGS. 3A-3D depict tables illustrating an exemplary decision-making process that the marketplace server goes through, in accordance with non-limiting embodiments.

DETAILED DESCRIPTION

Figure 1:
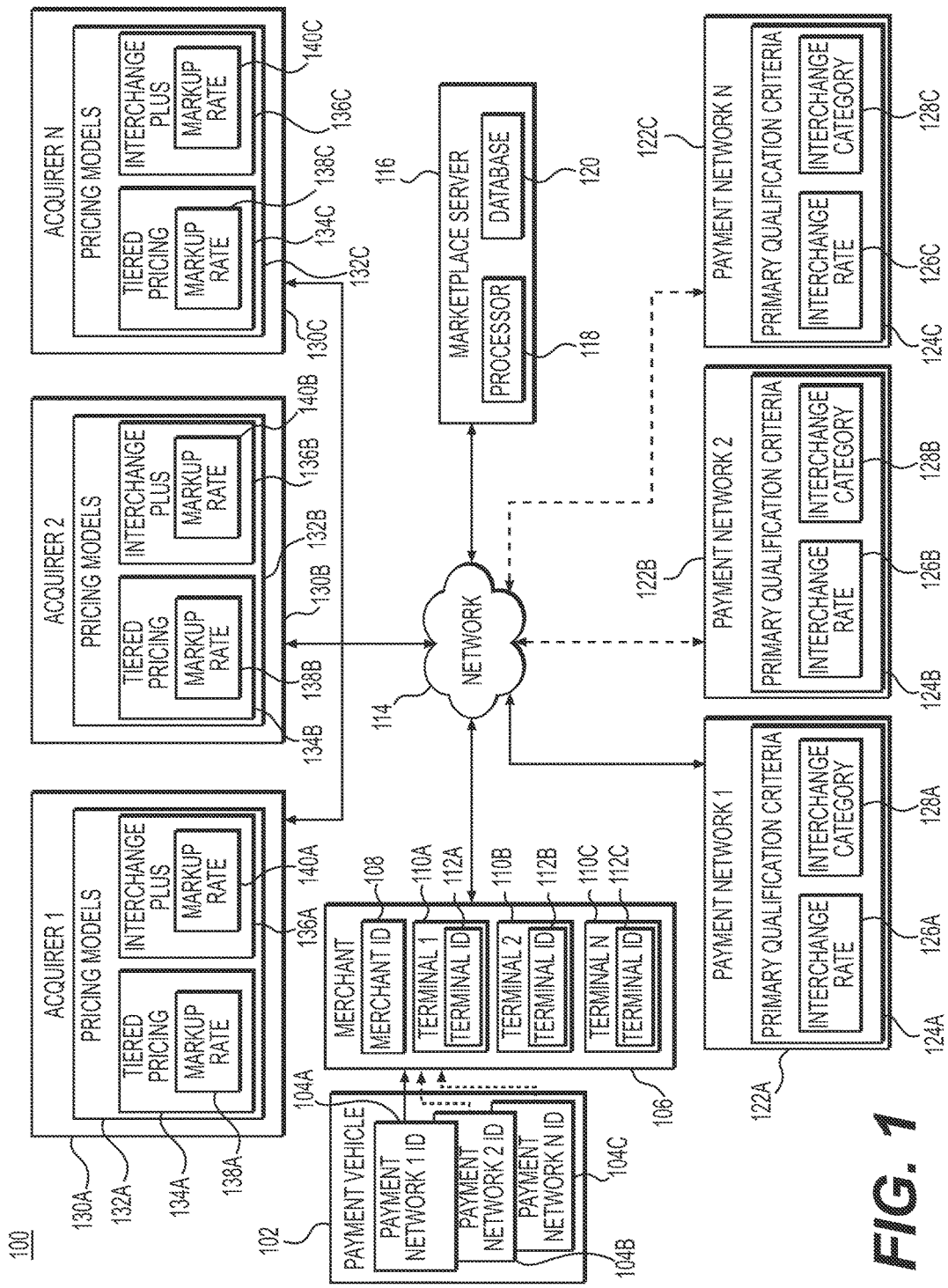
FIG. 1 depicts a block diagram of an example environment and systems for least cost acquirer routing, in accordance with non-limiting embodiments.

Various non-limiting embodiments of the present disclosure will now be described to provide an overall understanding of the principles of the structure, function, and use of systems and methods disclosed herein for the least cost acquirer routing for tiered and interchange plus pricing models.

As described above, the cost of discount fees charged by acquirers for payment transactions may impose significant costs on merchants, especially for large volumes of transactions. It may also be burdensome or otherwise impossible, to date, for a merchant, to sign up for and, at every payment transaction, search for, the least cost acquirer and/or pricing model, or be able to manage the communication of transaction information between payment terminals and acquirer processors, especially when there are different messaging formats used by the payment terminals or the acquirer processors.

Thus, the embodiments of the present disclosure are directed to methods and systems to identify and achieve the lowest cost for each purchase transaction initiated by a merchant through the creation of a marketplace model. The marketplace model may include a computing system, which may include a "marketplace server" that selects, from among a marketplace of acquirers, an acquirer that provides the "least cost" (e.g., lowest cost) discount rate. Furthermore, various embodiments of the present disclosure describe systems and methods for enabling the marketplace server to communicate and network efficiently between various payment terminals, and a plurality of acquirers.

The marketplace server may be an apparatus that acts as a marketplace for merchants, providing each merchant with a merchant identifier and one or more terminal identifiers at the time of sign up. The marketplace server may contain a database that hosts the interchange categories and/or interchange rates as laid out by the payment networks. These interchange categories and/or interchange rates may be determined by the payment networks (e.g., Visa, MasterCard, Discover, American Express, JCB, etc., for credit networks, and/or Star, Plus, Genie, Cirrus, etc., for debit networks) on a periodic basis and may be independent of the acquirer being used in the payment transaction. Each of these interchange categories and/or interchange rates, determined by the payment network, may be based on the payment network's own "primary qualification criteria," which may be a set of rules by which a given purchase transaction can be determined to fall into a particular interchange category and/or interchange rate for billing purpose. The primary qualification criteria may be based on the payment network being used, and may therefore be independent of the acquirer. In some embodiments, the primary qualification criteria may be based, further, on the card type and Merchant Category Code (MCC) assigned to the merchant by each payment network.

While the payment network may determine an interchange rate and/or interchange category, the acquirer may determine a pricing model for determining a markup price. In some embodiments, the interchange category and/or interchange rate may in turn be mapped to the pricing model. These pricing models may typically include, but are not limited to, a tier based pricing model and an interchange plus pricing model. The tier-based pricing model may include one or more of a qualified, mid-qualified, or non-qualified tiered pricing model, with each tier having its own markup rate. Likewise, the interchange plus pricing model may have its own markup. The markup rate may be added to the interchange rate to provide for the overall discount fee charged to the merchant for a payment transaction.

The merchant may sign up with as many acquirers as desired, and each acquirer may provide a markup rate based on the tiered pricing model and/or interchange plus pricing model being used. For each sign up with an acquirer, the merchant may receive a discount fee (e.g., the markup rate plus the interchange rate for a given payment transaction) as well as a distinct merchant identifier. Furthermore, each merchant may have one or more payment terminals ("terminals") enabling the merchant and/or its consumer to initiate a payment transaction using the consumers' payment vehicles. Each terminal may have a unique terminal identifier, and each terminal identifier may be mapped to the marketplace's merchant identifier and/or other terminal identifiers.

In particular, various embodiments of the present disclosure may provide a system and method for determining a routing plan associated with the lowest cost of transaction and/or processing fees set by an acquirer, and then routing each purchase transaction to an identified acquirer. Thus, various embodiments of the present disclosure assist merchants by automatically performing what may otherwise be burdensome tasks for a merchant, e.g., determining and signing up with the least cost (e.g., lowest cost) acquirer at every payment transaction. Furthermore, various embodiments may enable the merchant to communicate with the marketplace server (e.g., via the various terminals of the merchant) in a format understood by the marketplace server. The marketplace server may also be enabled to communicate with one or more acquirers using the corresponding message formats of those acquirers. Thus, systems and methods of the present disclosure describe a marketplace server that may have the capacity to communicate between systems (e.g., terminals, acquirers, etc.) in various messaging formats.

In some embodiments, it may be assumed that a payment transaction may settle within one day. For example, debit card transactions routed through debit networks, e.g., Genie, Star, Plus, etc., may be settled in near real-time as the authorized amount of the transaction may be readily available in the bank of the cardholder. Some embodiments of the present disclosure determine an interchange rate as per the primary qualification criteria of a payment network to determine the interchange category the transaction will fall under. In some embodiments, the interchange category may then be applied to determine an acquirer with a pricing model that yields the least cost, e.g., the lowest cost, markup rate (e.g., one of the appropriate tiered pricing models or the interchange plus pricing model offering the lowest markup rate, from one of many acquirers that the marketplace server may be subscribed to) before routing the transaction to the lowest cost acquirer for further authorization and processing.

One or more examples of these non-limiting embodiments are illustrated in the selected examples disclosed and described in detail with reference made to FIGS. 1, and 2A-2D in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an example environment and systems for acquirer routing using evaluations of acquirer processing fees. At a high level, the least cost acquirer routing environment and systems ("system") 100 comprises: a payment vehicle 102 being used at a merchant 106 via a terminal 110A-C; a computing system ("marketplace server" 116) that selects from among a marketplace of acquirers 130A-130C to determine a markup rate; various payment networks 122A-122C that determine or set interchange rates and/or interchange categories; and a network 114 that may enable communication between the various systems and entities. In some embodiments, the interchange category, as determined by various payment networks 122A-122C may be used to map an appropriate pricing model 132A-132C of an acquirer 130A-130C. It is also contemplated that for some merchants (e.g., e-commerce merchants, there may not be a physical terminal. In such embodiments, a merchant's server may serve as a terminal and the server may or may not have and/or send a terminal identifier.

Still referring to FIG. 1, the payment vehicle 102 may be a tangible object (e.g., a credit card, debit card, gift card, etc.), an electronic device (e.g., in the case of ApplePay, Samsung Pay, Bitcoin, or the like), and/or an intangible representation of a user's payment source that may be used to initiate a payment transaction at a payment terminal 110A-110C of a merchant 106 by delivering information regarding the consumer's payment source (e.g., payment network 1 ID 104A, payment network 2 ID 104B, . . . payment network N ID 104C, etc.). The payment vehicle may carry information of a payment network (e.g., Visa, MasterCard, Discover, American Express, JCB, etc., for credit networks, and/or Star, Plus, Genie, Cirrus, etc., for debit networks) using a payment network identification 104A-104C. The payment network identification may include one or more of a payment card number, an issuer identification number, a primary account number (PAN), a bank card number, and/or a bank identifier code of a payment source account. A consumer may initiate a payment transaction at a terminal, for example, by swiping a card and/or otherwise facilitating the transmission of payment network identification (e.g., electronically, verbally, etc.).

Still referring to FIG. 1, a merchant 106 may refer generally to any type of retailer, service provider, or any other type of business that is in networked communication with one or more acquirers (e.g., Acquirer 1 130A, Acquirer 2 130B, . . . Acquirer N 130C, etc.) and may use the payment processing services of the respective acquirers. Payment processing services may include receiving and responding to authorization requests as well as facilitating the settlement of funds associated with card-based transactions occurring at merchant 106. One or more terminals (e.g., Terminal 1 110A, Terminal 2 110B, . . . Terminal N 110C, etc.) may be mapped to merchant 106. As is known in the art, each terminal 110A-110C may be generally unmodified or "stock" and simply facilitate the standard transmission of transaction-related information to the computing system of an acquirer 130A-130C. In various embodiments of the present disclosure, the marketplace server 116 may act or be perceived by the terminals as an acquirer. Thus, each terminal 110A-C may simply facilitate the standard transmission of transaction-related information to the marketplace server 116. The transaction-related information may comprise a transaction authorization request ("authorization request"), including but not limited to, a payment amount, a date, a time, a payment network identification (e.g., a primary account number and/or issuer identification number) as well as other types of identifying indicia (e.g., merchant identification 108, terminal identification 112A-C, etc.). The identifying indicia may vary based on the terminal 112A-C, the type of merchant 106, or the payment network being used at the terminal.

Still referring to FIG. 1, the network 114 may serve as a means for communicating information across the various systems and entities of the least cost acquirer routing system and environment. For example, in some embodiments, the network may facilitate the transmission of payment transaction information as well as identifying information of the merchant, terminal, and payment network used, to the marketplace server via the cloud, e.g., the Internet, or any type of wired or wireless wide area network. Network 114 may facilitate the periodic or continual updating of the marketplace server on payment network interchange rates from various computing systems, as well as the markup rates for various acquirers from the computing systems of the respective acquirer institutions.

Still referring to FIG. 1, marketplace server 116 may be a computing system comprising a processor 118 and a database 120. In some embodiments, the marketplace server 116 may receive information from the merchant 106 and/or terminals 110A-C, maintain a database 120 of stored information related to payment networks and pricing models of a plurality of acquirers, periodically or continually update its database 120, and transmit information back to merchant 106 and/or terminals 110A-C. Upon the initiation of a payment transaction at a terminal 110A-C, the marketplace server may receive various transaction related information, which may include, but is not limited to, the merchant identification, the terminal identification, an identification of the payment network used in the transaction, the transaction amount, etc. In some embodiments, the payment network identification may include a payment card number, whose first six digits may identify an issuer and/or bank institution that is associated with a payment network. In some embodiments, the transaction-related information may also include information about the message format and/or language used by the terminal.

Still referring to FIG. 1, upon receiving the transaction-related information, the marketplace server may use the payment network identification to determine which payment network a transaction may be using (e.g., payment network 1 122A, payment network 2 122B, payment network 3 122C). Depending on the payment network being used, the marketplace server may subsequently use that payment network's primary qualification criteria 124A-124C to determine the interchange rate 126A-126C for the transaction. In some embodiments, the marketplace server may also use the primary qualification criteria 124A-124C to determine an interchange category. In some embodiments, the interchange category is determined based on the card type (e.g., payment network) and the merchant category code (MCC) assigned to the merchant by each payment network. Thereafter, marketplace server 116 selects, from one of many acquirers (e.g., Acquirer 1 130A, Acquirer 2 130B, . . . Acquirer N 130C, etc.), an acquirer that may yield the least cost markup rate for a given transaction. In some embodiments, this selection may include comparing the markup rates within various pricing models for each of the acquirers, selecting the pricing model yielding the lowest markup rate, for each of the acquirers, and then selecting the lowest markup rate among all the acquirers. The pricing models 132A-132C may include the tiered pricing models 134A-134C and the interchange plus pricing model 136A-136C. In some embodiments, the tiered pricing models may be further subdivided, for example, into a qualified, mid-qualified, and non-qualified tiers, and each tier may have its own markup rate. In such embodiments, the selection of the least cost markup rate may include determining the least cost markup rate among the various tiers of the tiered pricing models. In some embodiments, the type of pricing model and/or tier within the tiered pricing model may be determined based on the interchange category 128A-128C, which may be based on the type of payment network 122A-122C being used in the transaction.

Still referring to FIG. 1, in summary, once marketplace server 116 receives the transaction-related information from a terminal 110A-C via network 114, the marketplace server 116 may retrieve, from its database 120, the interchange rate based on the primary qualification criteria of the payment network being used in the transaction. For example, if the marketplace server identifies, based on the payment network ID provided in the received transaction-related information that payment network 1 122A is being utilized, marketplace server 116 may retrieve, from its database 120, the interchange rate 126A and interchange category 128A based on the primary qualification criteria 124A of payment network 1 122A. Subsequently, marketplace server 116 may determine, from one of many acquirers 130A-130C the markup rate that is the cheapest, based on one or more pricing models 132A-132C. In some embodiments, the markup rates for the various pricing models of an acquirer may be stored within database 120 of marketplace server 116. The database 120 may be continually and/or periodically updated by computing systems or servers representing the one or more acquirers 130A-130C.

Still referring to FIG. 1, once marketplace server 116 determines a matrix of various markup rates across acquirers, and thus a least cost markup rate, the marketplace server may determine the total rate to charge the merchant for the transaction. In some embodiments, the total rate may include adding the markup rate and the interchange rate. Typically, the markup rate and/or the interchange rate is determined to be one or more of a percentage of the transaction amount, a flat charge, or a value amount added to a percentage of the transaction amount. Once the interchange rate and the least cost markup rate has been identified (e.g., from the decision-making process depicted in FIGS. 2 and 3A-3C), the rates may be combined and/or be sent along with the transaction-related information to the selected acquirer with the least cost markup rate for further processing of the payment transaction. In some embodiments, the combined rates along with information related to or identifying the selected acquirer may be sent back to the payment terminal of the merchant or a computing system of the merchant. In other embodiments, after the combined rates along with transaction-related information has been sent to the selected acquirer with the least cost markup rate and the payment transaction has been further processed, the acquirer may send information ("transaction processing acknowledgment information") acknowledging the processing of the transaction back to marketplace server 116. In such embodiments, marketplace server 116 may communicate the transaction processing acknowledgment information to merchant 106 and/or payment terminal 110A-110C of the merchant.

Since the various payment terminals and servers belonging to the plurality of acquirers or payment networks, with which the marketplace transmits and/or receives information, may use different messaging formats, it is envisioned that in various embodiments of the present disclosure, the marketplace server has the ability to translate between and/or support platforms of various messaging formats. For example, if a payment terminal communicates transaction related information in JSON but acquirer 1 communicates information regarding the transaction in XML, the marketplace server may receive the information regarding the transaction from acquirer 1 in XML, translate the information to JSON, and deliver the information to the payment terminal in JSON. In some embodiments, the task of translating messages of various formats into a format readable by the recipient device (e.g., terminal) may be performed by processor 118 of marketplace server 116.

Still referring to FIG. 1, in some embodiments, marketplace server 116 may take the place of an acquirer that may enable the merchant to access the other acquirers (e.g., acquirer 1 130A, acquirer 2 130B, . . . acquirer N 130 C, etc.). The marketplace server 116, as a type of "stand in" acquirer, may assign the merchant an identifier (e.g., merchant ID 108), and each of the various terminals of the merchant with an identifier (e.g., terminal ID 112A-C). The merchant ID may be mapped to identifications of the merchant that may already be provided to the merchant by the other acquirers (e.g., acquirer 1 130A, acquirer 2 130B, acquirer N 130C) and/or payment networks. Likewise, the terminal ID may be mapped to identifications of a terminal that may already be provided to the terminal by the other acquirers (e.g., acquirer 1 130A, acquirer 2 130B, acquirer N 130C) and/or payment networks.

Figure 2:
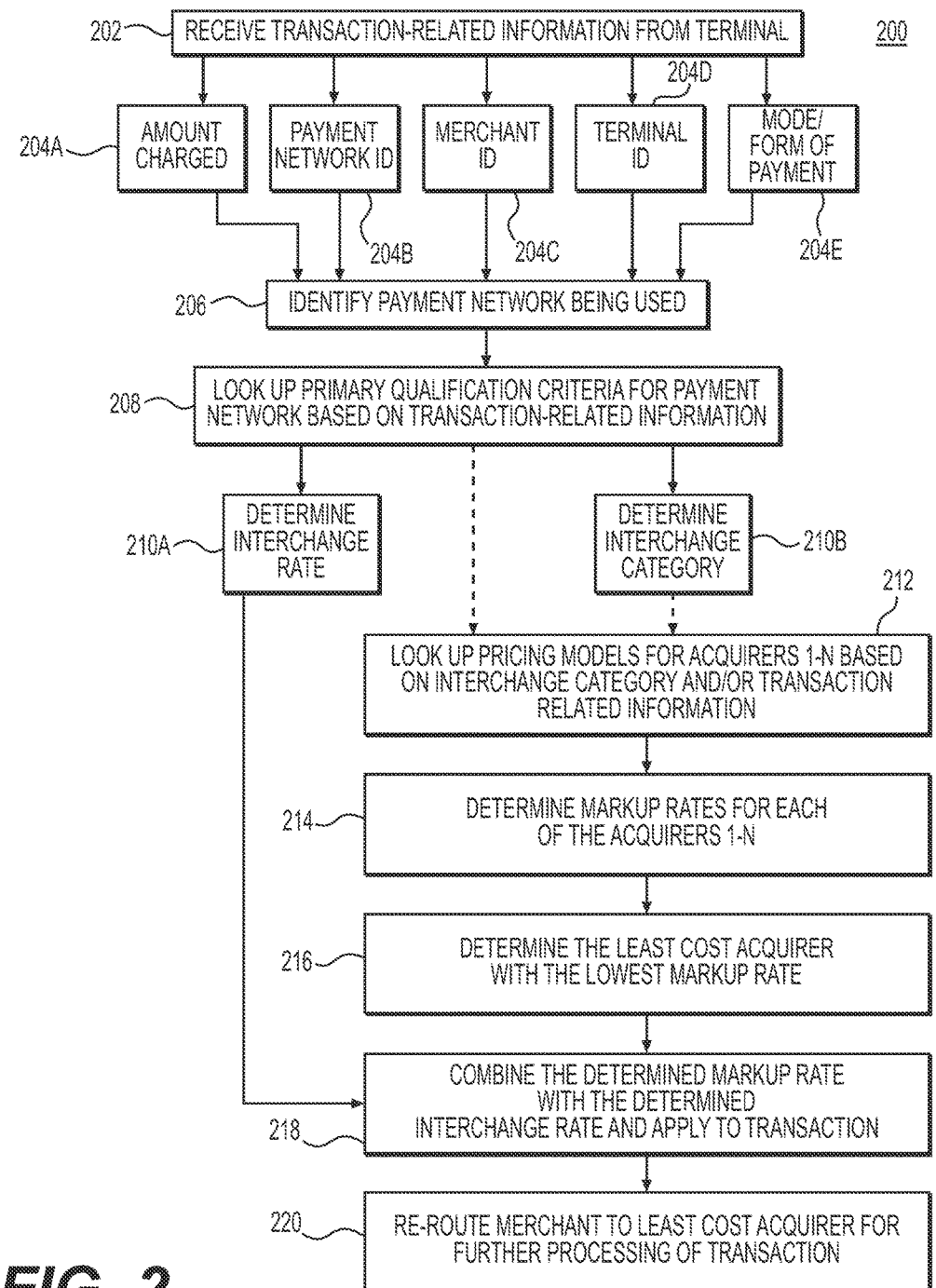
FIG. 2 depicts a flow diagram of an exemplary method executed by a marketplace server for determining a least cost acquirer based on a plurality of pricing models, in accordance with non-limiting embodiments.

FIG. 2 depicts an exemplary method 200 that may be executed by marketplace server 116 for determining the least cost acquirer based on pricing models.

Step 202 may include receiving transaction-related information from a terminal. As illustrated in steps 204A-204E, the transaction-related information may include the amount charged or to be charged in the payment transaction 204A, an identification of the payment network ("payment network ID") 204B, an identification of the merchant and/or merchant category ("merchant ID") 204C, an identification of the terminal at which the payment transaction has been initiated ("terminal ID") 204D, and the mode and/or form of payment 204E. In some embodiments, for example in transactions involving e-commerce, or an online purchase, the transaction-related information need not include a terminal ID, e.g., where a physical terminal does not exist. The modes and/or forms of payment 204E may include, but are not limited to, the type of card presented, the specific information contained in the transaction, how and when a payment transaction is processed, the industry of the merchant, whether additional services (e.g., address verification service (AVS)) are utilized, etc.

Step 206 may include identifying the payment network being used. In some embodiments, the payment network (e.g., Visa, MasterCard, Discover, American Express, JCB, etc., for credit networks, and/or Star, Plus, Genie, Cirrus, etc., for debit networks) may be identified from the first digit of the payment card number and/or a bank card number.

Step 208 may include the marketplace server looking up the primary qualification criteria for the payment network based on the transaction-related information. The primary qualification criteria may be a predetermined methodology for determining the interchange rate, and this primary qualification criteria may be prescribed by each respective one of the one or more payment networks. In some embodiment, the primary qualification may be based on more than just the payment network being used but also other transaction-related information, including, but not limited to, the type of card presented, the specific information contained in the transaction, how and when a payment transaction is processed, the industry of the merchant, whether additional services (e.g., address verification service (AVS)) are utilized, etc.

Step 210A may include determining the interchange rate using the primary qualification criteria. Likewise, step 210B may include determining the interchange category using the primary qualification criteria. In some embodiments, the interchange rate and/or interchange criteria may be determined without using the primary qualification criteria. Various payment networks (e.g., Visa, MasterCard, Discover, American Express, JCB, etc., for credit networks, and/or Star, Plus, Genie, Cirrus, etc., for debit networks) may require fees in addition to or as an alternative to the interchange fees, for example, program pricing fees. For purposes of disclosure, the terms "interchange rate" and/or "interchange fees" may be used to refer to the other fees charged to the merchant by the payment networks. In some embodiments, the interchange rate, may comprise a percentage and a value amount (e.g., 2.3%+10 Cents), where the percentage is applied on the transaction amount charged to the card and the value amount is added to the transaction amount charged. In some embodiments, the marketplace server may continually or periodically ping for and/or receive data on the primary qualification criteria, interchange categories, and/or interchange rates from the computing systems of the various payment networks using, for example, an update interface.

Step 212 may include the marketplace server looking up the pricing models for various acquirers (e.g., acquirer 1, acquirer 2, . . . acquirer N, etc.) based on the interchange category and/or transaction-related information. In some embodiments, the acquirer has the flexibility to decide which pricing model (e.g., qualified tier pricing model, mid-qualified tier pricing model, and non-qualified tier pricing model, and/or interchange plus pricing model) an interchange category will fall under. This determination may vary between acquirers for the payment network used in a payment transaction, the same merchant of the payment transaction, etc. For example, suppose there are two merchants, namely, Merchant A and Merchant B, that have the same MCC and processing method (i.e. card-present or card-not-present), and two acquirers, namely, Acquirer 1 and Acquirer 2. If a payment transaction were to occur with merchant A, and another payment transaction were to occur with merchant B, but both payment transactions utilized the same payment network for the same card number, item, transaction amount, etc., Acquirer 1 might designate the transaction as falling under a qualified tier pricing model, whereas Acquirer 2 might designate the transaction as falling under a mid-qualified tier pricing model.

Step 214 may include determining the markup rates for the looked up pricing models for each of the various acquirers (e.g., acquirer 1, acquirer 2, . . . acquirer N, etc.). The markup rates may vary based on the pricing model that an acquirer and/or interchange category has placed the transaction under, and may vary based on the transaction-related information (e.g., the amount to be charged in the payment transaction, payment network, the merchant ID, the terminal ID, the mode and/or form of payment, etc.). Various acquiring institutions may charge fees to merchants in addition to, or as an alternative to, the markup rate. For purposes of disclosure, a markup rate may refer to any combination of such fees. In some embodiments, the marketplace server may continually or periodically ping for and/or receive data on the pricing models and/or markup rates from the computing systems of the various acquirers using, for example, an update interface.

Step 216 may include determining the least cost acquirer with the lowest markup rate. Step 218 may include applying the markup rate of the least cost acquirer and the interchange rate of the identified payment network to the payment transaction. In some embodiments, step 218 may include combining the determined markup rate with the determined interchange rate and adding the sum to the amount charged. In some embodiments, step 218 may include adding the information related to the determined markup rate and interchange rate to the transaction-related information, and translating into a message format that is supported by or preferred by the least cost acquirer and/or terminal.

Step 220 may include re-routing the merchant to the determined least cost acquirer for further processing of the payment transaction. In some embodiments, for example, where the marketplace server 116 functions as an acquirer that a merchant may be subscribed to, step 220 may include substituting in the least cost acquirer to conduct the payment transaction as traditionally performed during payment transactions. In some embodiments, step 220 may include translating all transaction-related information, including the determined interchange rate and markup rate, into a message format that is supported by or preferred by the least cost acquirer and/or terminal.

Still referring to FIG. 2, steps 202 through 220 may be performed by a processor of the marketplace server, and the necessary information (e.g., primary qualification criteria, interchange categories, interchange rates, pricing models markup rates, etc.) may be looked up from an electronic storage medium and/or database of the marketplace server. The database may be continually or periodically updated using, for example, an update interface.

FIGS. 3A-3D depict tables illustrating an exemplary decision-making process that the marketplace server goes through, in accordance with non-limiting embodiments. Moreover, the decision-making process may occur after the initiation of a payment transaction at a terminal of a merchant or a dot com webserver i.e. website of the merchant, when the marketplace server receives one or more of, a merchant ID, a terminal ID, and the message format used by the terminal and/or merchant, and a payment network identification. In some embodiments, the decision-making process undertaken by the marketplace server may occur in the order of the decisions depicted in FIG. 3A, then FIG. 3B, then FIG. 3C, and finally FIG. 3D.

FIG. 3A depicts a table illustrating the decision of determining the interchange rate. As shown in FIG. 3A, the marketplace server determines the payment network being used based on the received payment network ID. In some embodiments, the payment network identification may include a primary account number, an issuer identification number, and/or a bank identification number, whose first digit identifies the type of payment network being used (e.g., Visa, Master Card, American Express, etc.). Based on the payment network being used, marketplace server 116 may use that payment network's primary qualification criteria to determine the interchange rate. The primary qualification criteria may be a predetermined methodology for determining the interchange rate, and this primary qualification criteria may be prescribed by one or more payment networks. In some embodiment, the primary qualification may be based on more than just the payment network being used but also other transaction-related information, including, but not limited to the type of card presented, the specific information contained in the transaction, how and when a payment transaction is processed, the industry of the merchant, whether additional services (e.g., address verification service (AVS)) are utilized, etc. Various payment networks (e.g., Visa, Master Card, American Express, etc.) may require fees in addition to or as an alternative to the interchange fees, for example, program pricing fees. For purposes of disclosure, the term interchange rate and/or interchange fees may be used to refer to the other fees charged to the merchant by the payment networks.

Still referring to FIG. 3A, each payment network 302 (e.g., payment network 1, payment network 2, payment network 3) has a different interchange rate 306 as determined by their primary qualification criteria 304. For example, if payment network 1 was used in the payment transaction, the marketplace server may determine based on primary qualification criteria of payment network 1, that the interchange rate is 1.6%.

FIG. 3B depicts a table illustrating the decision of determining the markup rates of various acquirers 308 based on their pricing models 310-316. As shown in FIG. 3B, the marketplace server may have data on the markup rates of various acquirers (e.g., acquirer 1, acquirer 2, acquirer N). In some embodiments, the marketplace server may continually or periodically ping for and/or receive data on the markup rates from the computing systems of the various acquirers using, for example, an update interface. As shown in FIG. 3B, the various markup rates for a given acquirer may depend on the pricing model being used. The pricing models may include an interchange plus pricing model 310, and various tiers of the tiered pricing model (e.g., qualified tier pricing model 312, mid-qualified tier pricing model 314, and non-qualified tier pricing model 316). For example, acquirer 1 has markup rates of 0.12% for the interchange plus pricing model 310, 0.05% for the qualified tier pricing model 312, 0.07% for the mid-qualified tier pricing model 314, and 0.08% for the non-qualified tier pricing model 316. For each acquirer, the marketplace server may identify the pricing model associated with the transaction at issue and/or yielding the least cost markup rate. In some embodiments, the particular pricing model may be determined based on the payment network, primary qualification criteria, interchange category, and/or transaction-related information, and the marketplace server may determine the acquirer that yields the lowest markup rate under the determined pricing model.

FIG. 3C depicts the results of the determination of the least cost markup rates for each acquirer. The marketplace server may then select the acquirer with the least cost markup rate. Thus, as shown in FIGS. 3B and 3C, the marketplace server selects a combination of an acquirer and a pricing model that yields the least cost markup rate. For example, as shown in the comparison table of FIG. 3C, the least cost markup rate for acquirer 1 318 is 0.05% and falls under the qualified tier pricing model. The least cost markup rate for acquirer 2 320 is 0.08% and falls under the mid-qualified tier pricing model. The least cost markup rate for acquirer N 322 is 0.07% and falls under the interchange plus pricing model. Therefore, the least cost acquirer in the example illustrated in FIG. 3C is acquirer 1, with a markup rate of 0.05%.

In some embodiments, for example, where the pricing model is determined based on the payment network, primary qualification criteria, interchange category, and/or transaction-related information, the marketplace server 116 may determine the acquirer having the least cost markup rate based on the determined or predetermined pricing model. Various acquiring institutions may charge fees to merchants in addition to or as an alternative to the markup rate. For purposes of disclosure, a markup rate may refer to any combination of such fees.

FIG. 3D depicts a table illustrating the decision of determining the markup rates of various acquirers based on their pricing models. The marketplace server may continually or periodically ping for or retrieve data related to the payment networks, primary qualification criteria, interchange rates, and/or interchange categories from computing systems representing payment networks. Likewise, the marketplace server may continually or periodically ping for or retrieve data related to the acquirer information, pricing models, and/or markup rates from computing systems representing acquirers. The data may be pinged for or retrieved using, for example, an update interface of marketplace server 116, and may be stored in an electronic storage medium of the marketplace server. Once the final markup rate and interchange rate have been decided (e.g., from the decision-making process depicted in FIGS. 3A-3C), the rates may be combined and/or be sent along with the transaction-related information to the selected acquirer with the least cost markup rate for further processing of the payment transaction. In some embodiments, the combined rates along with information related to or identifying the selected acquirer may be sent back to the payment terminal of the merchant. In other embodiments, after the combined rates along with transaction-related information has been sent to the selected acquirer with the least cost markup rate and the payment transaction has been further processed, the acquirer may send information ("transaction processing acknowledgment information") acknowledging the processing of the transaction back to the marketplace server. In such embodiments, the marketplace server may communicate the transaction processing acknowledgment information to the merchant and/or payment terminal of the merchant.

Still referring to FIG. 3D, in order to facilitate the various forms of communication described above between the various devices and systems (e.g., marketplace server, payment network computing systems, acquirer computing systems, terminals, merchant computing systems, etc.), each of which may support or prefer a different messaging format or language, the marketplace server may possess the ability to translate between the messaging formats and/or languages, for example, by using an information processor. Marketplace server 116 keeps track of the various messaging formats supported and/or preferred by the devices and systems. For example, as shown in FIG. 2D, marketplace server 116 might operate in the JSON messaging format 328, while acquirer 1 operates in the ISO 8583 message format, and acquirer 2 operates in the XML message format 334.

Still referring to FIG. 3D, the marketplace server may map identifications of the merchant or terminals assigned by marketplace server 116 (e.g., merchant ID 324, terminal ID 326, etc.) to the identifications of the merchant or terminals assigned by other acquirers (e.g., merchant ID 330, terminal ID 332, etc.). As explained herein, the merchant and/or terminal(s) of the merchant may have specific identification assigned to them by marketplace server 116 (e.g., merchant ID 324, terminal ID 326, etc.). However, each acquirer that the marketplace server and/or merchant may be subscribed to may assign the merchant and/or terminal(s) of the merchant with identifications, and these identifications may be different from the identifications assigned by the marketplace server. Thus, as shown in FIG. 3D, the marketplace server may look up the merchant and/or terminal of the merchant using the merchant ID and terminal ID included in the received transaction-related information (e.g., merchant ID: XYZ, terminal ID: 543546), and locate the merchant ID and terminal ID used by acquirer determined to have the least cost markup rate, for example, acquirer 2, which has assigned the same merchant with the ID, BKLW, and the same terminal with the ID, 3F55632. As illustrated from FIG. 3D, information related to the merchant ID, terminal ID, and messaging format of the various devices and systems with which the marketplace communications may be useful to the transmission or reception of relevant information (e.g., sending the transaction-related information to the selected acquirer).

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those ordinarily skilled in this area after having read this disclosure.

It is intended that the specification and examples be considered as exemplary only, with a true scope and spirit of the invention being indicated by the following claims.

What is claimed is:

1. A computer-implemented method for a least cost acquirer routing of electronic payment transactions based on pricing models of acquirers, the method comprising:

periodically pinging, by a server over an electronic network, (i) a plurality of payment networks for a plurality of current primary qualification criteria associated with the plurality of payment networks, a plurality of interchange categories for each of the plurality of payment networks, and a plurality of interchange rates associated with the plurality of interchange categories, and (ii) a plurality of acquirers for a plurality of current pricing models associated with the plurality of acquirers;

periodically updating, by the server, an electronic data store to store the plurality of current primary qualification criteria, interchange categories, interchange rates, and current pricing models;

receiving, at the server and from an electronic transaction terminal of a merchant over the electronic network, an electronic payment transaction, the electronic payment transaction including transaction-related information in a first messaging format including a merchant identifier of the merchant, a payment network identifier of a payment network used in the electronic payment transaction, and a transaction amount of the electronic payment transaction, wherein the merchant identifier was assigned to the merchant by the server based on pre-registration by the merchant with the server;

identifying, at the server, the payment network used for the electronic payment transaction based on the payment network identifier;

determining, at the server, the current primary qualification criteria pertaining to the identified payment network based on the plurality of current primary qualification criteria stored in the electronic data store;

determining, at the server, using the received transaction-related information and based on the determined current primary qualification criteria pertaining to the identified payment network, an interchange rate and an interchange category for the electronic payment transaction;

determining, at the server and for each acquirer of the plurality of acquirers, the current pricing model pertaining to the determined interchange category for the electronic payment transaction from the plurality of current pricing models stored in the electronic data store;

determining, at the server and for each acquirer of the plurality of acquirers, whether the current pricing model pertaining to the determined interchange category comprises one or more of: a tiered pricing model and an interchange plus pricing model;

determining, at the server and for each acquirer of the plurality of acquirers, a least cost pricing model from the one or more of: the tiered pricing model and the interchange plus pricing model, the least cost pricing model being specific to the electronic payment transaction;

generating, at the server and for each of the plurality of acquirers, a price comparison data structure for the electronic payment transaction, wherein the price comparison data structure stores a markup rate of the least cost pricing model in association with the corresponding acquirer of the plurality of acquires;

determining, at the server and based on the price comparison data structure, a least cost acquirer, from the plurality of acquirers, that yields the lowest markup rate applicable to the electronic payment transaction;

determining, at the server, a total applicable rate by combining the determined interchange rate and the lowest markup rate;

determining, at the server, (i) a merchant identifier assigned by the least cost acquirer that corresponds to the merchant identifier included in the transaction-related information and (ii) a second messaging format used by the least cost acquirer, based on a mapping data structure linking the merchant identifier in the translation-related information to the merchant identifier assigned by the least cost acquirer;

translating, at the server, the transaction-related information in the first messaging format to a second messaging format based on the mapping data structure, wherein the first messaging format is JavaScript Object Notation (JSON) and the second messaging format is one of Extensible Markup Language (XML) or ISO 8583; and transmitting, by the server and to the least cost acquirer over the electronic network, the translated transaction-related information and the total applicable rate.

2. The computer-implemented method of claim 1, wherein the transaction-related information further includes one or more of:
   the primary account number;
   the issuer identification number;
   the payment card number;
   the mode of payment, which includes a mode of payment that includes the swiping of a card, a mode of payment that includes keying in an identification related to the payment network, a contactless mode of payment, or a mode of payment that utilizes a chip); and
   whether an address verification system was utilized.

3. The computer-implemented method of claim 1, wherein the server is a plurality of servers on the electronic network.

4. The computer-implemented method of claim 1, further comprising:
   determining a messaging format supported or preferred by the least cost acquirer;
   if the received transaction-related information is in a messaging format that is different from the messaging format supported or preferred by the least cost acquirer, translating the transaction-related information into the messaging format supported or preferred by the least cost acquirer; and
   transmitting the translated transaction-related information to the least cost acquirer.

5. The computer-implemented method of claim 1, wherein the transaction-related information further comprises a terminal identifier of the electronic transaction terminal of the merchant, wherein the terminal identifier is mapped to the merchant identifier.

6. The computer-implemented method of claim 5, further comprising:
   receiving, from the electronic transaction terminal of the merchant, a message format supported or preferred by the electronic transaction terminal;
   receiving transaction processing acknowledgement information from the least cost acquirer;
   if the received transaction processing acknowledgement information from the least cost acquirer is in a messaging format that is different from the messaging format supported or preferred by the electronic transaction terminal of the merchant, translating the transaction processing acknowledgment information into the messaging format supported or preferred by the electronic transaction terminal of the merchant; and
   transmitting the translated transaction processing acknowledgment information to the electronic transaction terminal of the merchant.

7. The computer-implemented method of claim 1, wherein each acquirer has its own separate transaction processing system to process the electronic payment transaction using the transmitted transaction-related information.

8. A marketplace system for a least cost acquirer routing based on pricing models of acquirers, the marketplace system comprising:
- a data storage device storing instructions for the least cost acquirer routing; and
- a processor configured to execute the instructions to perform a method comprising:
  - periodically pinging, over an electronic network, (i) a plurality of payment networks for a plurality of current primary qualification criteria associated with the plurality of payment networks, a plurality of interchange categories for each of the plurality of payment networks, and a plurality of interchange rates associated with the plurality of interchange categories, and (ii) a plurality of acquirers for a plurality of current pricing models associated with the plurality of acquirers;
  - periodically updating an electronic data store to store the plurality of current primary qualification criteria, interchange categories, interchange rates, and current pricing models;
  - receiving, from an electronic transaction terminal of a merchant over the electronic network, an electronic payment transaction, the electronic payment transaction including transaction-related information in a first messaging format including a merchant identifier of the merchant, a payment network identifier of a payment network used in the electronic payment transaction, and a transaction amount of the electronic payment transaction, wherein the merchant identifier was assigned to the merchant by the marketplace system based on pre-registration by the merchant with the marketplace system;
  - identifying the payment network used for the electronic payment transaction based on the payment network identifier;
  - determining the current primary qualification criteria pertaining to the identified payment network based on the plurality of current primary qualification criteria stored in the electronic data store;
  - determining, using the received transaction-related information and based on the determined current primary qualification criteria pertaining to the identified payment network, an interchange rate and an interchange category for the electronic payment transaction;
  - determining, for each acquirer of the plurality of acquirers, the current pricing model pertaining to the determined interchange category for the electronic payment transaction from the plurality of current pricing models stored in the electronic data store;
  - determining, for each acquirer of the plurality of acquirers, whether the current pricing model pertaining to the determined interchange category comprises one or more of: a tiered pricing model and an interchange plus pricing model;
  - determining, for each acquirer of the plurality of acquirers, a least cost pricing model from the one or more of: the tiered pricing model and the interchange plus pricing model, the least cost pricing model being specific to the electronic payment transaction;
  - generating, for each of the plurality of acquirers, a price comparison data structure for the electronic payment transaction, wherein the price comparison data structure stores a markup rate of the least cost pricing model in association with the corresponding acquirer of the plurality of acquires;
  - determining, based on the price comparison data structure, a least cost acquirer, from the plurality of acquirers, that yields the lowest markup rate applicable to the electronic payment transaction;
  - determining a total applicable rate by combining the determined interchange rate and the lowest markup rate;
  - determining (i) a merchant identifier assigned by the least cost acquirer that corresponds to the merchant identifier included in the transaction-related information and (ii) a second messaging format used by the least cost acquirer, based on a mapping data structure linking the merchant identifier in the transaction-related information to the merchant identifier assigned by the least cost acquirer;
  - translating the transaction-related information in the first messaging format to a second messaging format based on the mapping data structure, wherein the first messaging format is JavaScript Object Notation (JSON) and the second messaging format is one of Extensible Markup Language (XML) or ISO 8583; and
  - transmitting, to the least cost acquirer over the electronic network, the translated transaction-related information and the total applicable rate.

9. The marketplace system of claim 8, wherein the marketplace system comprises a plurality of servers on the electronic network.

10. The marketplace system of claim 8, wherein the method further comprises:
- determining a messaging format supported or preferred by the least cost acquirer;
- if the received transaction-related information is in a messaging format that is different from the messaging format supported or preferred by the least cost acquirer, translating the transaction-related information into the messaging format supported or preferred by the least cost acquirer; and
- transmitting the translated transaction-related information to the least cost acquirer.

11. The marketplace system of claim 8, wherein the transaction-related information further comprises a terminal identifier of the electronic transaction terminal of the merchant, wherein the terminal identifier is mapped to the merchant identifier.

12. The marketplace system of claim 11, wherein the method further comprises:
- receiving, from the electronic transaction terminal of the merchant, a message format supported or preferred by the electronic transaction terminal;
- receiving transaction processing acknowledgement information from the least cost acquirer;
- if the received transaction processing acknowledgement information from the least cost acquirer is in a messaging format that is different from the messaging format supported or preferred by the electronic transaction terminal of the merchant, translating the transaction processing acknowledgment information into the messaging format supported or preferred by the electronic transaction terminal of the merchant; and
- transmitting the translated transaction processing acknowledgment information to the electronic transaction terminal of the merchant.

13. The marketplace system of claim 8, wherein each acquirer has its own separate transaction processing system to process the electronic payment transaction using the transmitted transaction-related information.

14. A non-transitory machine-readable medium storing instructions that, when executed by a computing system that selects from among a marketplace of acquirers, causes the computing system to perform a method for a least cost acquirer routing based on pricing models of the acquirers, the method including:
  periodically pinging, by a server over an electronic network, (i) a plurality of payment networks for a plurality of current primary qualification criteria associated with the plurality of payment networks, a plurality of interchange categories for each of the plurality of payment networks, and a plurality of interchange rates associated with the plurality of interchange categories, and (ii) a plurality of acquirers for a plurality of current pricing models associated with the plurality of acquirers;
  periodically updating, by the server, an electronic data store to store the plurality of current primary qualification criteria, interchange categories, interchange rates, and current pricing models;
  receiving, at the server and from an electronic transaction terminal of a merchant over the electronic network, an electronic payment transaction, the electronic payment transaction including transaction-related information in a first messaging format including a merchant identifier of the merchant, a payment network identifier of a payment network used in the electronic payment transaction, and a transaction amount of the electronic payment transaction, wherein the merchant identifier was assigned to the merchant by the server based on pre-registration by the merchant with the server;
  identifying, at the server, the payment network used for the electronic payment transaction based on the payment network identifier;
  determining, at the server, the current primary qualification criteria pertaining to the identified payment network based on the plurality of current primary qualification criteria stored in the electronic data store;
  determining, at the server, using the received transaction-related information and based on the determined current primary qualification criteria pertaining to the identified payment network, an interchange rate and an interchange category for the electronic payment transaction;
  determining, at the server and for each acquirer of the plurality of acquirers, the current pricing model pertaining to the determined interchange category for the electronic payment transaction from the plurality of current pricing models stored in the electronic data store;
  determining, at the server and for each acquirer of the plurality of acquirers, whether the current pricing model pertaining to the determined interchange category comprises one or more of: a tiered pricing model and an interchange plus pricing model;
  determining, at the server and for each acquirer of the plurality of acquirers, a least cost pricing model from the one or more of: the tiered pricing model and the interchange plus pricing model, the least cost pricing model being specific to the electronic payment transaction;
  generating, at the server and for each of the plurality of acquirers, a price comparison data structure for the electronic payment transaction, wherein the price comparison data structure stores a markup rate of the least cost pricing model in association with the corresponding acquirer of the plurality of acquires;
  determining, at the server and based on the price comparison data structure, a least cost acquirer, from the plurality of acquirers, that yields the lowest markup rate applicable to the electronic payment transaction;
  determining, at the server, a total applicable rate by combining the determined interchange rate and the lowest markup rate;
  determining, at the server, (i) a merchant identifier assigned by the least cost acquirer that corresponds to the merchant identifier included in the transaction-related information and (ii) a second messaging format used by the least cost acquirer, based on a mapping data structure linking the merchant identifier in the transaction-related information to the merchant identifier assigned by the least cost acquirer;
  translating, at the server, the transaction-related information in the first messaging format to a second messaging format based on the mapping data structure, wherein the first messaging format is JavaScript Object Notation (JSON) and the second messaging format is one of Extensible Markup Language (XML) or ISO 8583; and
  transmitting, by the server and to the least cost acquirer over the electronic network, the translated transaction-related information and the total applicable rate.

15. The non-transitory machine-readable medium of claim 14, wherein the server is a plurality of servers on the electronic network.

16. The non-transitory machine-readable medium of claim 14 further comprising:
  determining a messaging format supported or preferred by the least cost acquirer;
  if the received transaction-related information is in a messaging format that is different from the messaging format supported or preferred by the least cost acquirer, translating the transaction-related information into the messaging format supported or preferred by the least cost acquirer; and
  transmitting the translated transaction-related information to the least cost acquirer.

* * * * *